(12) United States Patent
Hanan (10) Patent No.: US 11,975,891 B2
(45) Date of Patent: May 7, 2024

(54) SINGLE ANCHOR CLOSURE

(71) Applicant: NIAGARA BOTTLING, LLC, Diamond Bar, CA (US)

(72) Inventor: Jay Clarke Hanan, Glendora, CA (US)

(*) Notice: Subject to any disclaimer, the term of this patent is extended or adjusted under 35 U.S.C. 154(b) by 100 days.

(21) Appl. No.: 18/162,044

(22) Filed: Jan. 31, 2023

(65) Prior Publication Data

US 2023/0174275 A1 Jun. 8, 2023

Related U.S. Application Data

(63) Continuation of application No. PCT/US2021/045064, filed on Aug. 6, 2021, and a continuation of application No. 16/988,484, filed on Aug. 7, 2020, now abandoned.

(51) Int. Cl.
*B65D 41/34* (2006.01)
*B29C 45/14* (2006.01)
*B29L 31/56* (2006.01)

(52) U.S. Cl.
CPC .... *B65D 41/3428* (2013.01); *B29C 45/14467* (2013.01); *B29L 2031/565* (2013.01)

(58) Field of Classification Search
CPC .......... B65D 41/3428; B29C 45/14467; B29L 2031/565
USPC ....................................................... 215/252
See application file for complete search history.

(56) References Cited

U.S. PATENT DOCUMENTS 3,441,161 A   4/1969   Baarn
3,796,338 A   3/1974   Wilton
3,904,062 A   9/1975   Grussen
4,043,475 A   8/1977   Wheeler
4,180,174 A   12/1979  Quinn
4,217,989 A   8/1980   George
4,346,811 A   8/1982   Hilaire (Continued)

FOREIGN PATENT DOCUMENTS

CN   1213348 A   4/1999
CN   1631740 A   6/2005

(Continued)

OTHER PUBLICATIONS

PCT Application No. PCT/US2020/045364, International Search Report dated Oct. 22, 2020.

(Continued)

*Primary Examiner* — J. Gregory Pickett
*Assistant Examiner* — Niki M Eloshway (57) ABSTRACT

A closure includes a closure portion defining a closure top wall and a closure side wall extending from closure top wall. The closure portion is configured to be removed from a finish portion of the container by rotatably disengaging from threads of the finish portion. A tamper evidence band configured to remain engaged with the finish portion when the closure portion is removed from the finish portion. A multiplicity of thin connections attaching the tamper evidence band to the closure portion. The thin connections configured to break apart when the closure portion is removed from the container. An anchor extending from the closure portion to the tamper evidence band. The anchor configured to keep the closure portion attached to the tamper evidence band when the closure portion is removed from the container.

23 Claims, 4 Drawing Sheets

(56) References Cited

U.S. PATENT DOCUMENTS

| | | | |
|---|---|---|---|
| 4,394,918 A * | 7/1983 | Grussen | B65D 41/3428 215/253 |
| 4,432,461 A * | 2/1984 | Mumford | B65D 41/3447 215/252 |
| 4,478,343 A | 10/1984 | Ostrowsky | |
| 4,505,401 A | 3/1985 | Berglund | |
| 4,530,436 A | 7/1985 | Wiedmer | |
| 4,564,114 A | 1/1986 | Cole | |
| 4,565,295 A | 1/1986 | Mori et al. | |
| 4,567,991 A | 2/1986 | Anderson | |
| 4,573,601 A | 3/1986 | Berglund | |
| 4,625,875 A | 12/1986 | Carr et al. | |
| 4,664,279 A | 5/1987 | Obrist et al. | |
| 4,744,479 A * | 5/1988 | Schottli | B65D 41/3452 215/252 |
| 4,805,793 A | 2/1989 | Lecinski, Jr. | |
| 5,056,675 A | 10/1991 | Julian | |
| 5,074,425 A * | 12/1991 | Wustmann | B65D 41/3447 215/252 |
| 5,080,246 A * | 1/1992 | Hayes | B65D 41/3428 215/252 |
| 5,215,204 A | 6/1993 | Beck | |
| 5,246,125 A * | 9/1993 | Julian | B65D 41/3447 215/252 |
| 5,295,600 A | 3/1994 | Kowal | |
| 5,405,032 A | 4/1995 | Anderson | |
| 5,725,115 A | 3/1998 | Bosi et al. | |
| 5,779,075 A | 7/1998 | Salmon et al. | |
| 6,581,792 B1 | 6/2003 | Limanjaya | |
| 7,228,979 B2 | 6/2007 | Lomg, Jr. | |
| 8,443,993 B1 * | 5/2013 | Desselle | B65D 55/16 215/354 |
| 8,602,234 B2 | 12/2013 | Hayashi | |
| 8,695,822 B2 * | 4/2014 | Kwon | B65D 55/16 215/258 |
| 8,720,716 B2 * | 5/2014 | Campbell | B65D 41/34 215/253 |
| 9,643,762 B2 * | 5/2017 | Maguire | B65D 41/04 |
| 10,654,624 B2 * | 5/2020 | Sung | B65D 55/16 |
| 10,717,568 B2 | 7/2020 | Defert | |
| 10,836,544 B2 * | 11/2020 | Kim | B65D 43/169 |
| 10,947,015 B2 | 3/2021 | Smith | |
| 2002/0014467 A1 * | 2/2002 | Reidenbach | B65D 41/0471 220/291 |
| 2004/0251228 A1 | 12/2004 | Charles, Jr. | |
| 2007/0289937 A1 | 12/2007 | Kaneko et al. | |
| 2008/0197135 A1 | 8/2008 | Berman | |
| 2009/0236304 A1 * | 9/2009 | Watson | G09F 3/04 215/386 |
| 2011/0174760 A1 * | 7/2011 | Luzzato | B65D 41/48 215/258 |
| 2011/0278299 A1 * | 11/2011 | Schueller | B65D 55/06 220/288 |
| 2015/0251827 A1 | 9/2015 | Campbell | |
| 2017/0217646 A1 | 8/2017 | Hanan | |
| 2018/0170625 A1 | 6/2018 | Sung | |
| 2019/0185219 A1 | 6/2019 | Wang et al. | |
| 2019/0344933 A1 | 11/2019 | Kim | |
| 2019/0344944 A1 * | 11/2019 | Maguire | B65D 47/147 |
| 2019/0375555 A1 * | 12/2019 | Edie | B65D 1/0246 |
| 2020/0017260 A1 * | 1/2020 | Migas | B65D 51/248 |
| 2020/0207525 A1 * | 7/2020 | Sung | B65D 47/0871 |
| 2021/0094733 A1 * | 4/2021 | Bloom | B65D 41/3442 |
| 2021/0300634 A1 | 9/2021 | Maguire | |
| 2021/0362910 A1 * | 11/2021 | Morgan | B65D 55/16 |
| 2021/0394970 A1 * | 12/2021 | Dodd | B65D 41/3428 |

FOREIGN PATENT DOCUMENTS

| | | |
|---|---|---|
| CN | 111924311 A | 11/2020 |
| DE | 3727887 A1 | 3/1989 |
| DE | 29606186 U1 | 7/1997 |
| DE | 10024072 C1 | 11/2001 |
| DE | 102018128886 A1 | 7/2020 |
| EP | 0799772 A1 | 10/1997 |
| EP | 1151932 A1 | 11/2001 |
| EP | 3837186 A1 | 6/2021 |
| FR | 1479330 A | 5/1967 |
| FR | 2499519 A1 | 8/1982 |
| GB | 2279940 A | 1/1995 |
| JP | 11255251 A | 9/1999 |
| KR | 20220013266 A | 2/2022 |
| WO | 199414674 A1 | 7/1994 |
| WO | 199830462 A1 | 7/1998 |
| WO | 2002026582 A1 | 4/2002 |
| WO | 2003026980 A1 | 4/2003 |
| WO | 2009048273 A2 | 4/2009 |
| WO | 2019100015 A1 | 5/2019 |
| WO | 2019177616 A1 | 9/2019 |
| WO | 2019207148 A1 | 10/2019 |
| WO | 2020037010 A1 | 2/2020 |
| WO | 2020041640 A1 | 2/2020 |
| WO | 2020102122 A2 | 5/2020 |
| WO | 2020178012 A1 | 9/2020 |
| WO | 2020201227 A1 | 10/2020 |
| WO | 2021001433 A1 | 1/2021 |
| WO | 2021021095 A1 | 2/2021 |
| WO | 2021074726 A1 | 4/2021 |
| WO | 2021074727 A1 | 4/2021 |
| WO | 2021074728 A1 | 4/2021 |
| WO | 2021080550 A1 | 4/2021 |
| WO | 2021129931 A1 | 7/2021 |

OTHER PUBLICATIONS

International Search Report with Written Opinion for related Application No. PCT/US2021/045064 dated Nov. 12, 2021 (16 Pages).

* cited by examiner

SINGLE ANCHOR CLOSURE

CROSS-REFERENCE TO RELATED APPLICATION

The present application is a continuation of PCT/US2021/045064, filed Aug. 6, 2021, which claims the priority benefit of U.S. Non-Provisional patent application Ser. No. 16/988,484, filed on Aug. 7, 2020, the entire contents of which are hereby incorporated by reference.

TECHNICAL FIELD

Embodiments of the present disclosure generally relate to the field of plastic bottles and preforms. More specifically, embodiments of the present disclosure relate to an apparatus and methods for a container closure that includes a single anchor configured to keep the closure coupled with a plastic container after the closure has been unsealed to access contents within the container.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. Advantages of PET containers include lighter weight and decreased breakage as compared to glass, and lower costs overall when taking both production and transportation into account. PET resins are also reasonably priced and easy to process. PET containers are generally made by a process that includes the blow-molding of plastic preforms which have been made by injection molding of the PET resin.

Advantages of plastic containers include lighter weight and decreased breakage as compared to glass, and lower costs overall when taking both production and transportation into account. As such, there is a continuous interest in creating the lightest possible plastic container so as to maximize cost savings in both transportation and manufacturing by making and using containers that contain less plastic.

A PET container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish portion. The finish portion is adapted to receive a closure, such as a bottle cap, to seal the contents within the interior of the plastic container.

In many instances, the closure includes a tamper evidence band that is disposed around the perimeter of the finish portion. The tamper evidence band generally remains positioned on the finish portion when an end-user loosens the closure to access the contents within the container. As such, the tamper evidence band and the finish portion cooperate to indicate to the end-user whether or not the closure has been previously loosened after being installed by the manufacturer.

One difficulty that may be associated with closures typically installed onto plastic containers is that once the closure is removed from the container, the closure is separable from the container. This may result in the closure being misplaced or lost after being removed from the container, thus hindering resealing unfinished liquid contents within the container. In some instances, misplaced or lost closures may contribute to plastic waste littering the environment. As such, there is a desire to attach or tether closures to plastic containers so as to reduce the environmental impact of misplaced closures while maintaining the convenience and enjoyment often associated with drinking beverages by way of plastic containers. Embodiments disclosed herein provide container closures that include anchors configured to keep the closures coupled with plastic containers after the closures have been unsealed to access contents within the containers.

SUMMARY

An apparatus and methods are provided for a container closure for sealing contents within an interior of a container. The container closure comprises a closure portion that is coupled to a tamper evidence band by a single anchor. The anchor is configured to keep the closure portion coupled with the tamper evidence band. The closure portion threadably engages with a finish portion of the container and seals contents in the interior of the container. The tamper evidence band remains engaged with the finish portion when the closure portion is removed from the finish portion. A multiplicity of thin connections between the tamper evidence band and the closure portion break apart when the closure portion is untightened from the finish portion. The anchor remains unbroken and allows the closure portion to be tilted away from the finish portion. In some embodiments, the tamper evidence band may further include a split that allows the tamper evidence band to snap into two portions that remain coupled to the closure portion only by way of the anchor. As such, the tamper evidence band, once broken and separated away from the closure portion, may provide an observational indication that the container closure has been unsealed from the finish portion after having been installed by a manufacturer.

In an exemplary embodiment, a closure for sealing contents within an interior of a container comprises: a closure portion for threadably engaging with a finish portion of the container; a tamper evidence band for engaging with the finish portion; and an anchor for keeping the closure portion attached to the tamper evidence band.

In another exemplary embodiment, a multiplicity of thin connections attach the tamper evidence band to closure portion and are configured to break apart when the closure portion is untightened from the finish portion. In another exemplary embodiment, the tamper evidence band is configured to remain engaged with the finish portion when the closure portion is removed from the finish portion, thereby causing the thin connections to break apart and allow the closure portion to separate from the tamper evidence band. In another exemplary embodiment, the anchor is configured such that only the thin connections break apart during loosening of the closure portion. In another exemplary embodiment, the anchor is formed during injection-molding by allowing material comprising the closure to remain disposed between a pair of adjacent thin connections.

In another exemplary embodiment, the anchor comprises a single piece of material that extends between the tamper evidence band and the closure portion. In another exemplary embodiment, the anchor is configured to keep the closure portion attached to the finish portion after the closure portion is unsealed from the finish portion. In another exemplary embodiment, the anchor is configured to flex when the closure portion is tilted with respect to the tamper evidence band. In another exemplary embodiment, the anchor comprises a relatively thick portion of plastic that is configured to resist breaking during tilting the closure portion away from the finish portion.

In an exemplary embodiment, a method for a closure to seal contents within an interior container comprises: configuring a closure portion for threadably engaging with a finish portion of the container; configuring a tamper evidence band for engaging with the finish portion; and joining the closure portion and the tamper evidence band by way of an anchor.

In another exemplary embodiment, joining includes configuring the anchor to keep the closure portion attached to the finish portion after the closure portion is unsealed from the finish portion. In another exemplary embodiment, joining includes configuring the anchor to flex when the closure portion is tilted with respect to the tamper evidence band. In another exemplary embodiment, joining includes extending a single piece of material comprising the anchor between the tamper evidence band and the closure portion.

In another exemplary embodiment, joining includes coupling the closure portion and the tamper evidence band by way of a multiplicity of thin connections configured to break apart when the closure portion is untightened from the finish portion. In another exemplary embodiment, joining includes configuring the anchor such that only the thin connections break apart during loosening of the closure portion. In another exemplary embodiment, configuring the anchor includes injection-molding such that material comprising the closure fills one or more spaces between adjacent thin connections.

In an exemplary embodiment, a method for a closure comprises: loosening a closure portion threaded onto a finish portion of the container; breaking a multiplicity of thin connections disposed between the closure portion and a tamper evidence band engaged with the finish portion; and bending an anchor that joins the closure portion and the tamper evidence band. In another exemplary embodiment, bending the anchor includes tilting the closure portion away from the finish portion.

The disclosure provides, in one aspect, a closure for sealing contents within an interior of a container. The closure comprising a closure portion defining a closure top wall and a closure side wall extending from closure top wall, the closure portion configured to be removed from a finish portion of the container by rotatably disengaging from threads of the finish portion, a tamper evidence band configured to remain engaged with the finish portion when the closure portion is removed from the finish portion, a multiplicity of thin connections attaching the tamper evidence band to the closure portion, the thin connections configured to break apart when the closure portion is removed from the container, and an anchor extending from the closure portion to the tamper evidence band, the anchor configured to keep the closure portion attached to the tamper evidence band when the closure portion is removed from the container.

In some aspects, the thin connections are configured to break apart from the tamper evidence band and remain attached to the closure portion to allow the closure portion to separate from the tamper evidence band. In some aspects, the anchor and each one of the thin connections have a cross-sectional area when viewed in a plane parallel to closure top wall. In some aspects, the cross-sectional area of the anchor is at least 2 times greater than the cross-sectional area of each of the thin connections. In some aspects, the cross-sectional area of the anchor is in a range from 0.4 $mm^2$ to 6 $mm^2$ and the cross-sectional area of each of the thin connections is in a range from 0.05 $mm^2$ to 0.5 $mm^2$. In some aspects, the cross-sectional area of the anchor is in a range from 0.4 $mm^2$ to 0.6 $mm^2$ and the cross-sectional area of each of the thin connections is in a range from 0.1 $mm^2$ to 0.3 $mm^2$. In some aspects, the anchor has a width that is at least 2 times greater than a width of any of the thin connections. In some aspects, the anchor has a width in a range from 0.5 mm to 12 mm and the thin connections each have a width in a range from 0.1 mm to 1 mm, and the width of the anchor is greater than the width of each of the thin connections. In some aspects, the closure portion has a circumference in a range from 70 mm to 100 mm. In some aspects, the width of the anchor is in a range from 1 percent to 20 percent of the circumference of the anchor and the width of each of the thin connections is in a range from 0.1 percent to 2 percent of the circumference. In some aspects, the width of the anchor is in a range from 1 percent to 3 percent of the circumference and the width of each of the thin connections is in a range from 0.5 percent to 1.5 percent of the circumference. In some aspects, the anchor has a width in a range from 1 mm to 5 mm and the thin connections each have a width in a range from 0.2 mm to 1 mm, and the width of the anchor is greater than the width of each of the thin connections. In some aspects, the thin connections are configured to break apart when a force above a first predetermined threshold is applied to the closure portion, and the first predetermined threshold is in a range from 2 to 15 N. In some aspects, the anchor is configured to remain attached to the closure portion when the force applied to the closure portion is below a second predetermined threshold that is greater than the first predetermined threshold. In some aspects, the second predetermined threshold is in a range from 10 to 25 N, and the second predetermined threshold is greater than the first predetermined threshold. In some aspects, the anchor comprises a single piece of material that extends between the tamper evidence band and the closure portion. In some aspects, wherein the closure has a melt flow index in a range from 2 to 18. In some aspects, the closure portion has a first melt flow index and the tamper evidence band has a second melt flow index that is less than the first melt flow index.

The disclosure provides, in one aspect, a closure for sealing contents within an interior of a container. The closure comprising a closure portion having interior threads configured to rotatably engage and disengage from threads of a finish portion, the interior threads having a thread pitch of less than 2 millimeters to reduce a distance the closure portion travels during disengagement with the threads of the finish portion, a tamper evidence configured to remain engaged with the finish portion when the closure portion is removed from the finish portion and an anchor attaching the closure portion to the tamper evidence band, the anchor configured to keep the closure portion attached to the tamper evidence band when the closure portion disengages with the threads of the finish portion.

In some aspects, the thread pitch is in a range from 0.5 mm to 1.5 mm. In some aspects, the closure portion has a height in a range from 6 mm to 8 mm.

Other aspects of the disclosure will become apparent by consideration of the detailed description and accompanying drawings.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first container," may be made. However, the specific numeric reference should not be interpreted as a literal sequential order but rather interpreted that the "first container" is different than a "second container." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, there is a desire to attach or anchor closures to plastic containers so as to reduce the environmental impact of misplaced closures while maintaining the convenience and enjoyment often associated with drinking beverages by way of plastic containers. One difficulty typically associated with closures installed onto plastic containers is that once the closure is removed from the container, the closure may be misplaced or lost. Lost closures hinder resealing unfinished liquid contents within containers and may contribute to plastic waste littering the environment. Embodiments disclosed herein provide container closures that include anchors configured to keep the closures coupled with plastic containers after the closures have been unsealed to access contents within the containers.

Figure 1:
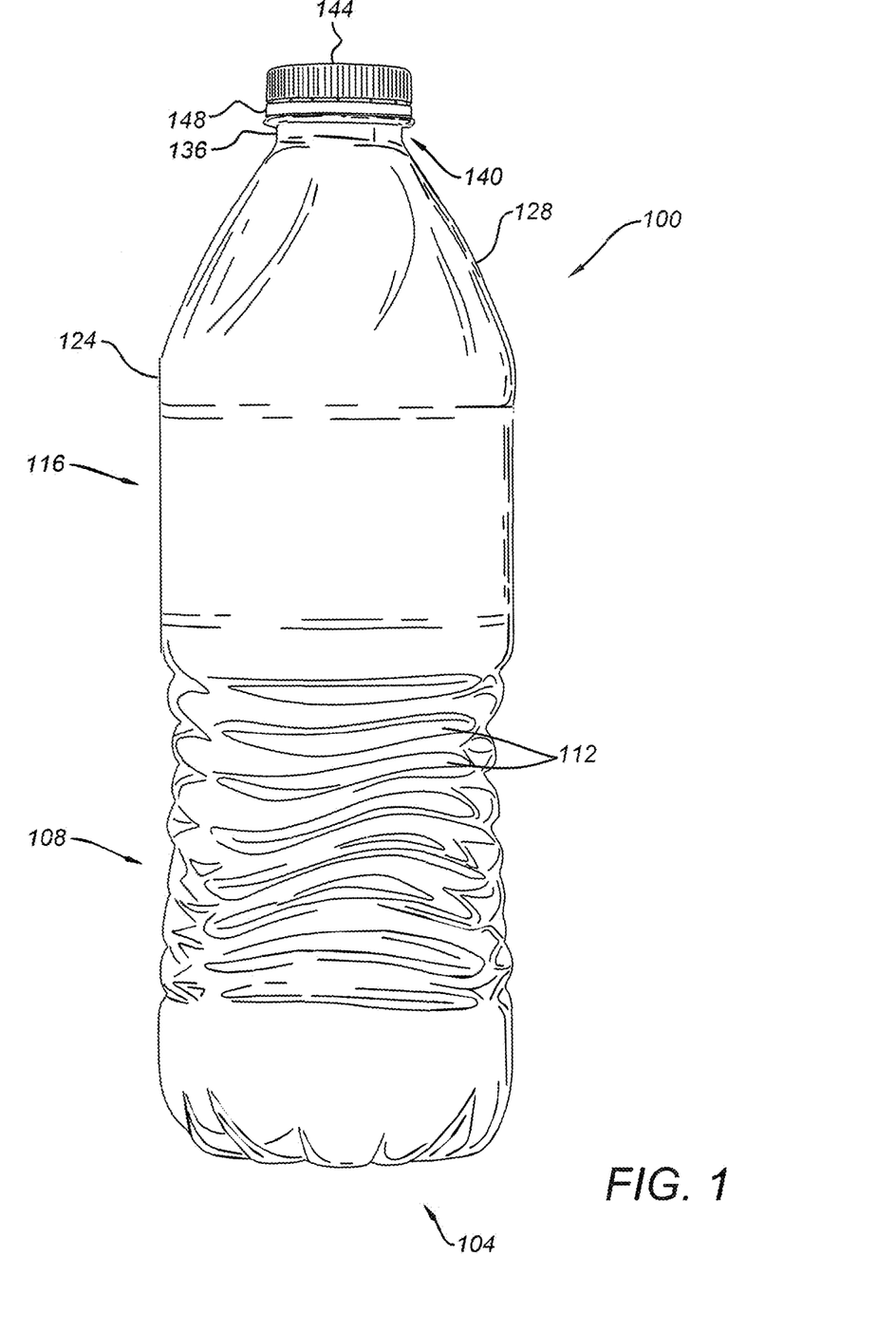
FIG. 1 illustrates a side view of an exemplary container suitable for storing liquid.

FIG. 1 illustrates a side view of an exemplary container 100 typically used for storing liquid contents, such as water, juice, and contents under pressure. The container 100 comprises a base 104 that extends up to a grip portion 108. In some embodiments, the base 104 may be of the petaloid variety, although other configurations of the base may be incorporated into the container 100, without limitation. The grip portion 108 comprises a plurality of grip portion ribs 112 (i.e., sidewall ribs). As illustrated in FIG. 1, the plurality of grip portion ribs 112 generally vary in depth, and swirl or angulate around the grip portion 108. A label portion 116 is connected to the grip portion 108 and comprises one or more label panel ribs (not shown). The label panel portion 116 transitions into a shoulder 124, which connects to a bell 128.

In the embodiment illustrated in FIG. 1, the bell 128 comprises a plurality of design features 132. In other embodiments, however, the bell 128 may include various other design features, or may be smooth and generally unornamented. The bell 128 connects to a neck 136, which connects to a finish portion 140. As shown in FIG. 1, the bell 128 comprises a diameter that generally decreases as the bell 128 extends upward from the shoulder 124 to the neck 136 and the finish portion 140. The finish portion 140 is adapted to receive a closure, such as by way of non-limiting example, a container cap or closure 144, so as to seal contents within the container 100. The finish portion 140 generally defines an opening that leads to an interior of the container 100 for containing a beverage, or other contents, such as any of a variety of carbonated soft drinks. The finish portion 140 may be of a Carbonated Soft Drink (CSD) variety or may be configured to receive closures suitable for sealing noncarbonated contents within the interior of the container 100. Further, in some embodiments, the finish portion 140 may be configured to retain hot-filled contents with the container or may be configured to retain a gas, such as nitrogen gas (N2) within the interior of the container, without limitation.

As shown in FIG. 1, a tamper evidence closure 144, such as a bottle cap, may be threadably engaged with the finish portion 140. The closure 144 generally includes interior threads that are configured to engage with threads disposed on the finish portion 140, as described herein. During tightening of the closure 144 onto the finish portion 140, a plug seal of the closure 144 extends into the opening of the container 100 and enters into a pressed relationship with the finish portion 140 whereby contents may be sealed in the interior of the container 100.

With continuing reference to FIG. 1, the closure 144 includes a tamper evidence band 148 to provide an indication of whether or not the closure 144 has been loosened after being installed by a manufacturer. In some embodiments, the tamper evidence band 148 may be attached to the closure 144 by a multiplicity of thin connections. The tamper evidence band 148 may include a cam that is configured to fixedly engage with a tamper evidence ledge disposed on the finish portion 140 during loosening of the closure 144. Once the closure 144 is installed onto the finish portion 140 by a manufacturer and later an end-user loosens the closure 144, the cam engages the tamper evidence ledge, breaking the thin connections between tamper evidence band 148 and the closure 144. The tamper evidence band 148 remains positioned on the tamper evidence ledge after the closure 144 is removed from the container 100. As such, the tamper evidence band 148 cooperates with the tamper evidence ledge to indicate to the end-user whether or not the closure 144 has been previously loosened after being installed by the manufacturer.

Figure 2:
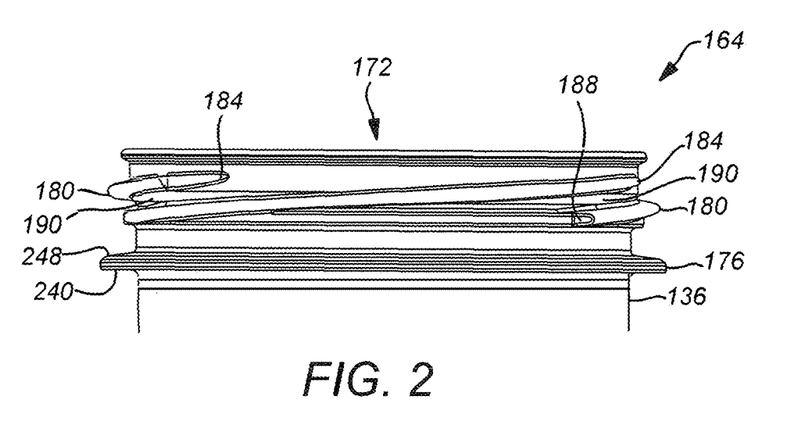
FIG. 2 illustrates a side plan view of an exemplary embodiment of the finish portion that is configured to rotatably engage with a closure to seal contents within the interior of the container.

FIG. 2 illustrates a side plan view of an exemplary embodiment of a finish portion 164 that is configured to rotatably engage with the closure 144 so as to seal contents within the interior of the container 100. The finish portion 164 comprises a cylindrical body that begins at an opening 172 to an interior of the container 100 and extends to and includes a tamper evidence ledge 176 that is joined to a neck portion 136 of the container 100. The finish portion 164 is further characterized by the presence of one or more threads 180 configured to provide a means to fasten a closure, such as the closure 144 of FIG. 1, to the container 100. As such, the threads 180 are configured to rotatably engage with similar threads disposed within the closure 144 so as to seal contents within the container 100. In the embodiment illustrated in FIG. 2, each of the threads 180 generally extends along a section of the circumference of the finish portion 164 and approaches the tamper evidence ledge 176. Thus, when the threads of the closure 144 are engaged with the threads 180, and the closure 144 is rotated in a clockwise direction, the closure 144 advances toward the tamper evidence ledge 176.

With continuing reference to FIG. 2, each of the one or more threads 180 begins at a thread start 184 and extends along an angular section of the finish portion 164 to a thread end 188. The thread start 184 is configured to guide a thread comprising the closure 144 into a space, or a valley 190, between adjacent threads 180 so as to threadably engage the closure 144 with the finish portion 164. Further, the threads 180 generally are disposed adjacently to one another, separated by valleys 190, and spaced uniformly around the circumference of the finish portion 164. In some embodiments, wherein three threads 180 are disposed around the finish portion 164, the thread starts 184 of adjacent threads 180 are spaced at substantially 120-degree intervals around the circumference of the finish portion 164. As will be appreciated, however, more or less than three threads 180 may be incorporated into the finish portion 164 without deviating beyond the scope of the present disclosure.

Figure 3:
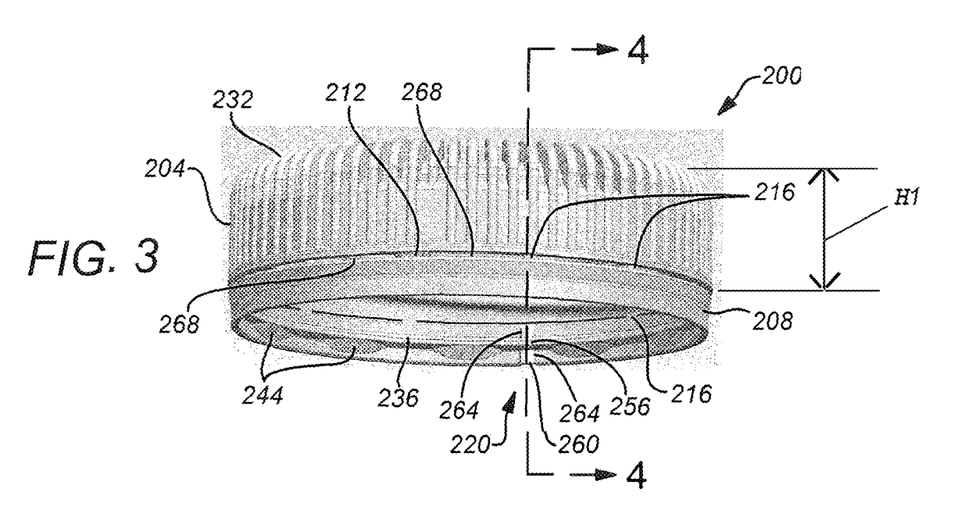
FIG. 3 illustrates lower isometric view of an exemplary embodiment of a single anchor container closure that may be threadably engaged with the finish portion shown in FIG. 2.

FIG. 3 illustrates an exemplary embodiment of a single anchor container closure (hereinafter "closure") 200 that may be threadably engaged with the finish portion 164 shown in FIG. 2. The illustrated embodiment of the closure 200 includes a closure portion 204 that is coupled with a tamper evidence band 208 by way of a single anchor 212 and a multiplicity of thin connections 216. The closure portion 204 defines a closure top wall 205 and a closure sidewall 206 extending from the closure top wall 205. Upon the closure portion 204 being removed from the container 100, through a force applied to the closure portion 204 (e.g., the closure portion 204 is rotated) above a first predetermined threshold, the thin connections 216 break, allowing the tamper evidence band 208 to partially separate from the closure portion 204 while the anchor 212 keeps the tamper evidence band 208 attached to the closure portion 204. In some embodiments, the anchor 212 may include regions of reduced cross sectional area (e.g., slits, recesses, thinner regions, a smooth contour, etc.), be non-continuous (e.g., formed with multiple pieces), have various cross-sectional areas (e.g., rectangular, circular, etc.) to increase the flexibility of the anchor 212.

The construction of the closure 200 keeps the anchor 212 attached to the closure portion 204 when the force applied to the closure portion 204 is below a second predetermined threshold, but breaks the thin connections 216 when the force is above the first predetermined threshold, which is less than the second predetermined threshold. For example, the first predetermined threshold may be in a range from 2 to 15 Newtons (N) and the second predetermined threshold may be in a range from 10 N to 25 N. In other embodiments, the second predetermined threshold may correspond to federal requirements set forth for tethered closures. In some embodiments, such as the illustrated embodiment of FIG. 3, the tamper evidence band 208 may further include a split 220 that allows the tamper evidence band 208 to snap into two portions that remain coupled to the closure portion 204 only by way of the anchor 212. As such, the tamper evidence band 208, once broken and separated away from the closure portion 204, provides an observational indication that the closure 200 has been unsealed from the finish portion 164 after having been installed by a manufacturer.

Figure 4:
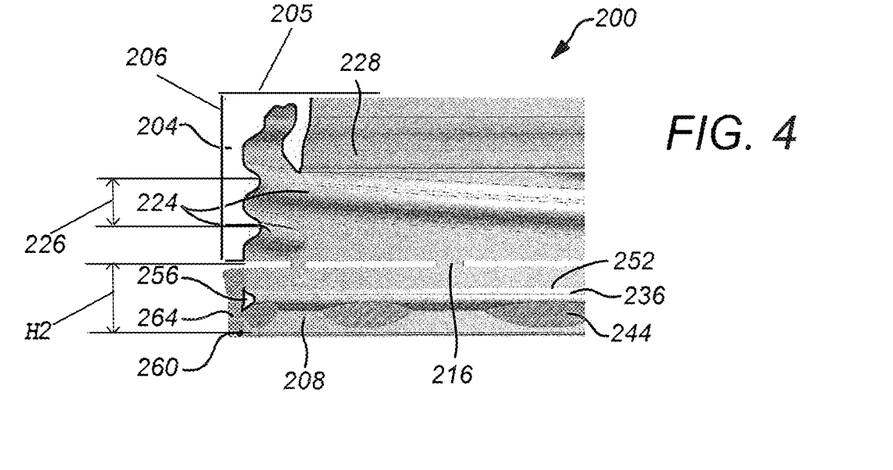
FIG. 4 illustrates a partial cross-sectional view of the single anchor container closure of FIG. 3, taken along line 4-4.

With reference to FIG. 4, the closure 200 is configured to be threadably engaged with the finish portion 164 shown in FIG. 2. The closure 200 includes interior threads 224 that are configured to engage with the threads 180 of the finish portion 164, as described herein. As such, the threads 224 extend into the valleys 190 extending around the finish portion 164. During tightening of the closure 200 onto the finish portion 164, a plug seal 228 of the closure 200 may extend into the opening 172 of the finish portion 164 and enter into a pressed relationship with the finish portion 164 whereby contents may be sealed in the interior of the container 100. A thread pitch 226 is also defined between adjacent threads 224 on the closure 200. For example, the thread pitch 226 is the distance between a crest or central region of the adjacent threads 224. The thread pitch 226 may be less than 2 mm. In the illustrated embodiment, the thread pitch is in a range from 0.5 mm to 1.5 mm, which reduces the amount of travel required by the closure portion 204 during tightening and untightening. The shallow thread pitch 226 also reduces the overall height H1 of the closure portion 204. In the illustrated embodiment, the height of the closure is in a range from 6 mm to 8 mm. In other words, the thread pitch 226 is shallow and shorter relative to other closures known in the art. As a result, the amount of stress imparted on the anchor 212 is reduced. As shown in FIG. 3, a plurality of knurls 232 may be arranged on top of the closure portion 204 and configured to facilitate grasping the closure portion 204 during tightening and untightening the closure 200 on the finish portion 164.

The closure 200 and the tamper evidence band 208 may be formed of high-density polyethylene (HDPE). Due to the lightweight construction of the closure portion 204 and the shallow thread pitch 226, the closure portion 204 is able to be supported by the anchor 212 when the closure portion 204 is removed from the finish portion 164. In the illustrated embodiment, the tamper evidence band 208 has a height H2 of 2 mm. In other embodiments, the height H2 may be in a range from 1 mm to 4 mm. Increasing the height of the tamper evidence band 208 effectively increases the rigidity of the tamper evidence band 208 and the ability to support the closure portion 204.

The HDPE material of the closure 200 (e.g., the closure portion 204, the thin connections 216, the anchor 212, and the tamper evidence band 208) has a melt flow index (MFI). In general, the closure 200 is more flexible the higher the MFI. In the illustrated embodiment, the closure 200 has an MFI of 11. In other embodiments, the closure 200 may have an MFI in a range from 2 to 18. In some embodiments, the closure portion 204 may have a first MFI and the tamper evidence band 208 may have a second MFI. In some embodiments, the second MFI of the tamper evidence band 208 is less than the first MFI of the closure portion 204. In other words, the tamper evidence band 208 may be more rigid or stiff when compared to the closure portion 204.

As mentioned above, the multiplicity of thin connections 216 may be configured to break apart when the closure portion 204 is untightened from the finish portion 164, such as during opening the container 100 to access contents within the container 100. As shown in FIGS. 3-4, the tamper evidence band 208 includes a cam 236 that interferes with a flat lower portion 240 of the tamper evidence ledge 176 (see FIG. 2). The cam 236 generally comprises a ledge, or a similar structure, that extends around an inner circumference of the tamper evidence band 208 and is supported by a multiplicity of angled lower surfaces 244 configured to facilitate passing the tamper evidence band 208 over an upper rounded portion 248 (see FIG. 2) of the tamper evidence ledge 176 during installation of the closure 200 onto the container 100. As shown in FIG. 4, the cam 236 includes a relatively flat upper surface 252 that may be configured to interfere with the flat lower surface 240 (see FIG. 2) of the tamper evidence ledge 176 and thus contributes to separating the tamper evidence band 208 and the closure portion 204 during loosening of the closure 200 on the finish portion 164.

In the embodiment illustrated in FIGS. 3-4, the tamper evidence band 208 includes a split 220 that comprises a break, or a separation, in the tamper evidence band 208 that is connected by only a cam bridge 256 and a thin bridge 260. The cam bridge 256 and the thin bridge 260 maintain a connection between ends 264 of the tamper evidence band 208, and thus impart continuity to the tamper evidence band 208. As shown in FIG. 4, the cam bridge 256 and the thin bridge 260 have cross-sectional areas that are much smaller than the cross-sectional area of the tamper evidence band 208. It is contemplated, therefore, that the cam bridge 256 and the thin bridge 260 are strong enough to remain intact during installation of the closure 200 onto the finish portion 164 while allowing the split 220 to separate during removal of the closure 200 from the container 100.

Figure 5:
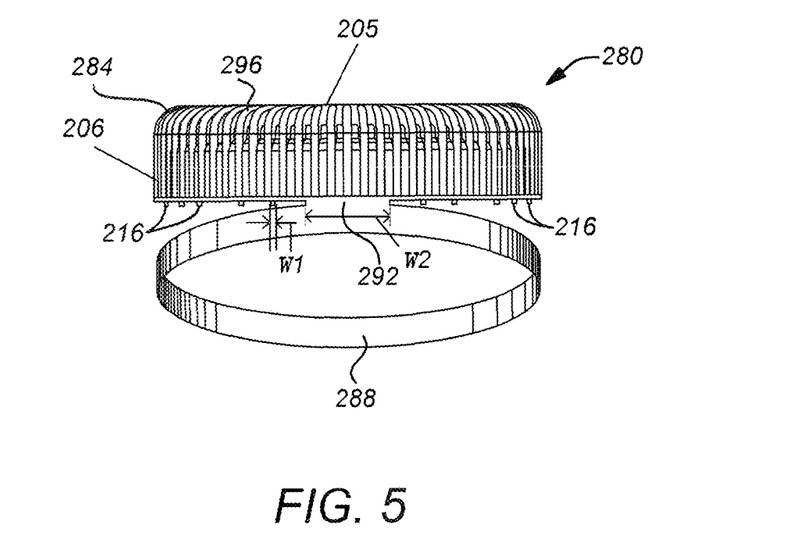
FIG. 5 illustrates an anchored configuration of an exemplary embodiment of a single anchor container closure that may occur upon the container closure being loosened from a container.

FIG. 5 illustrates an anchored configuration of an exemplary embodiment of a single anchor container closure 280 that may occur upon the container closure 280 being loosened from a container, such as the container 100. The container closure 280 includes a closure portion 284 that is coupled with a tamper evidence band 288 by way of a single anchor 292 and a multiplicity of thin connections 216. The closure portion 284 also defines a closure top wall 205 and a closure sidewall 206 extending from the closure top wall 205. When the closure portion 284 is removed from the container 100, the thin connections 216 break, allowing the tamper evidence band 288 to partially separate from the closure portion 284 while the anchor 292 keeps the tamper evidence band 288 attached to the closure portion 284, as shown in FIG. 4. Unlike the tamper evidence band 208, shown in FIG. 3, the tamper evidence band 288 of FIG. 5 comprises a continuous loop of plastic suited for coupling the closure portion 284 to the container 100 solely by way of the anchor 292. It is contemplated that the anchor 292 comprises a relatively thick portion of plastic that is configured to resist breaking during tilting the closure portion 284 away from the finish portion 164 of the container 100.

It is contemplated that, in general, the anchor 292 may be configured similarly to the tamper evidence band 288, such that only the thin connections 216 break apart during loosening of the closure portion 284. For example, in some embodiments wherein the container closure 280 is formed by way of injection-molding, the anchor 292 may be formed by allowing the material comprising the container closure 280 to remain disposed between a pair of adjacent thin connections 216. In one exemplary embodiment, a mold for injection-molding the container closure 280 may be configured to allow the material comprising the container closure 280 to fill one or more spaces 268 (see FIG. 3) between the thin connections 216. As such, one or more protrusions comprising the mold that form the spaces 268 may be omitted in the location of the mold that forms the anchor 292, as shown in FIG. 5. Further, in some embodiments wherein a knife or other type of blade is used to form the spaces 268 after injection-molding the container closure 280, the blade may be configured to avoid cutting the container closure 280 at the location of the anchor 292. It should be understood, therefore, that the anchor 292 is formed generally by leaving material comprising the container closure 280 intact within one or more spaces 268 between the thin connections 216, and thus the anchor 292 may be formed by way of various diverse techniques without limitation, and without deviating beyond the spirit and scope of the present disclosure. In other words, the closure 280 and the tamper evidence band 288 each have a circumference and a portion of the circumference is devoid of the thin connections 216 and the anchor 292. In the illustrated embodiment, the circumference of the closure 280 and the tamper evidence band 288 is 83 mm. In other embodiments, the circumference may be in a range from 70 mm to 100 mm.

The thin connections 216 have a width W1 and the anchor 292 has a width W2. In the illustrated embodiment, the width W1 of the thin connections 216 is 0.85 mm and the width W2 of the anchor 292 is 2 mm. Therefore, the width W2 of the anchor 292 is at least two times greater than the width W1 of the thin connections 216. In addition, the thickness or depth of the thin connections 216 and the anchor 292 is 0.25 mm. As such, the anchor 292 and each of the thin connections 216 have a cross-sectional area when viewed in a plane parallel to the closure top wall 205 when the closure portion 284 is secured to the finish portion 164 of the container. In the illustrated embodiment, the cross-sectional area of one of the thin connections 216 is 0.21 mm$^2$ and the cross-sectional area of the anchor 292 is 0.5 mm$^2$. Therefore, the cross-sectional area of the anchor 292 is at least two times greater than the cross-sectional area of the thin connections 216.

In other embodiments, the width W1 of the thin connections 216 may be in a range from 0.1 mm to 0.4 mm and the width W2 of the anchor 292 may be in a range from 0.5 mm to 12 mm. In other embodiments, the width W1 of the thin connections 216 may be in a range from 0.4 mm to 1 mm and the width W2 of the anchor 292 may be in a range from 1.5 mm to 12 mm. The thin connections 216 and the anchor 292 may also have a thickness in a range from 0.1 mm to 1 mm. In some embodiments, the thickness of the anchor 292 may be greater than the thickness of the thin connections 216. In these additional embodiments, the thin connections 216 may have a cross-sectional area in a range from 0.05 mm$^2$ to 0.5 mm$^2$ and the anchor 292 may have a cross-sectional area in a range from 0.4 mm$^2$ to 6 mm$^2$. In addition, the width W2 of the anchor 292 is in a range from 1 percent to 20 percent of the circumference of the tamper evidence band 208 and the closure portion 280. The width W1 of the thin connections 216 is in a range from 0.1 percent to 2 percent of the circumference of the tamper evidence band 208 and the closure portion 280. In the illustrated embodiment, the width W2 of the anchor 292 is 2 percent of the circumference of the tamper evidence band 208 and the closure portion 280 and the width W1 of the thin connections 216 is 1 percent of the circumference of the tamper evidence band 208 and the closure portion 280.

Figure 6:
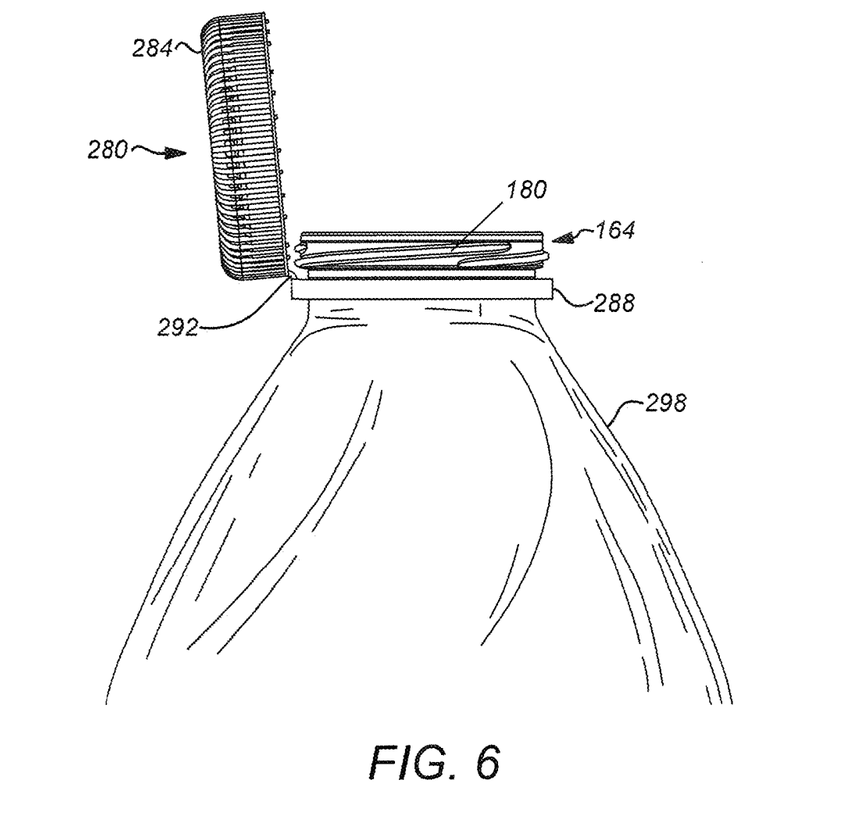
FIG. 6 illustrates an exemplary-use environment wherein the single anchor container closure of FIG. 5 has been installed onto a finish portion of a container and then subsequently untightened and tilted away from the finish portion.

FIG. 6 illustrates an exemplary-use environment wherein the container closure 280 has been installed onto a finish portion 164 (see FIG. 2) of a container 298 and then subsequently untightened from the finish portion 164 of the container 298. During installation of the container closure 280 onto the container 298, the rounded upper portion 248 of the tamper evidence ledge 176 facilitates passing the tamper evidence band 288 over the tamper evidence ledge 176. As described herein, the flat lower portion 240 of the tamper evidence ledge 176 retains the tamper evidence band 288 positioned below the tamper evidence ledge 176 during loosening of the closure portion 284. As such, applying a force to the closure portion loosens the closure portion 284 on the finish portion 164, which causes the thin connections 216 to break apart, thus causing the container closure 280 to assume the anchored configuration discussed in connection with FIG. 5.

As shown in FIG. 6, upon removing the closure portion 284 from threads 180 on the finish portion 164, the anchor 292 bends and allows the closure portion 284 to be tilted with respect to the tamper evidence band 288. As such, the anchor 292 keeps the closure portion 284 attached to the container 298 after the closure portion 284 is unsealed from the finish portion 164 to access the contents within the container 298. It is contemplated that keeping the closure portion 284 coupled with the container 298 will substantially eliminate instances of misplacing the closure portion 284, thereby encouraging the end-user to reengage the closure portion 284 with the finish portion 164 to store unfinished contents within the container 298, as well as preventing the closure portion 284 from contributing to plastic waste being deposited into the environment.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A closure for sealing contents within an interior of a container, the closure comprising:
    a closure portion defining a closure top wall and a closure side wall extending from the closure top wall, the closure portion configured to be removed from a finish portion of the container by rotatably disengaging from threads of the finish portion;
    a tamper evidence band configured to remain engaged with the finish portion when the closure portion is removed from the finish portion;
    a multiplicity of thin connections attaching the tamper evidence band to the closure portion, the thin connections configured to break apart when a force above a first predetermined threshold is applied to the closure portion; and
    an anchor extending from the closure portion to the tamper evidence band, the anchor configured to keep the closure portion attached to the tamper evidence band when the force applied to the closure portion is below a second predetermined threshold that is greater than the first predetermined threshold,
    wherein the closure portion has a first melt flow index in a range from 2 to 18 and the tamper evidence band has a second melt flow index that is less than the first melt flow index.

2. The closure of claim 1, wherein the anchor and each one of the thin connections have a cross-sectional area when viewed in a plane parallel to closure top wall.

3. The closure of claim 2, wherein the cross-sectional area of the anchor is at least two times greater than the cross-sectional area of each of the thin connections.

4. The closure of claim 3, wherein the cross-sectional area of the anchor is in a range from 0.4 $mm^2$ to 6 $mm^2$ and the cross-sectional area of each of the thin connections is in a range from 0.05 $mm^2$ to 0.5 $mm^2$.

5. The closure of claim 3, wherein the cross-sectional area of the anchor is in a range from 0.4 $mm^2$ to 0.6 $mm^2$ and the cross-sectional area of each of the thin connections is in a range from 0.1 $mm^2$ to 0.3 $mm^2$.

6. The closure of claim 1, wherein the anchor has a width that is at least two times greater than a width of any of the thin connections.

7. The closure of claim 1, wherein:
    the anchor has a width in a range from 0.5 mm to 12 mm and the thin connections each have a width in a range from 0.1 mm to 1 mm, and
    the width of the anchor is greater than the width of each of the thin connections.

8. The closure of claim 7, wherein the closure portion has a circumference in a range from 70 mm to 100 mm.

9. The closure of claim 8, wherein the width of the anchor is in a range from 1 percent to 20 percent of the circumference of the anchor and the width of each of the thin connections is in a range from 0.1 percent to 2 percent of the circumference.

10. The closure of claim 8, wherein the width of the anchor is in a range from 1 percent to 3 percent of the circumference and the width of each of the thin connections is in a range from 0.5 percent to 1.5 percent of the circumference.

11. The closure of claim 1, wherein:
    the anchor has a width in a range from 1 mm to 5 mm and the thin connections each have a width in a range from 0.2 mm to 1 mm, and
    the width of the anchor is greater than the width of each of the thin connections.

12. The closure of claim 1, the first predetermined threshold is in a range from 2 to 15 N.

13. The closure of claim 1, wherein the anchor comprises a single piece of material that extends between the tamper evidence band and the closure portion.

14. The closure of claim 1, wherein the second predetermined threshold is in a range from 15 to 25 N.

15. The closure of claim 1, wherein the second predetermined threshold is in a range from 20 to 25 N.

16. The closure of claim 1, wherein the second predetermined threshold is in a range from 22 to 25 N.

17. The closure of claim 1, wherein the second predetermined threshold is in a range from 10 to 25 N.

18. A closure for sealing contents within an interior of a container, the closure comprising:
- a closure portion having interior threads configured to rotatably engage and disengage from threads of a finish portion, the interior threads having a thread pitch of less than 2 millimeters to reduce a distance the closure portion travels during disengagement with the threads of the finish portion;
- a tamper evidence band configured to remain engaged with the finish portion when the closure portion is removed from the finish portion; and
- an anchor attaching the closure portion to the tamper evidence band, the anchor configured to keep the closure portion attached to the tamper evidence band when the closure portion disengages with the threads of the finish portion,
- wherein the closure portion has a first melt flow index in a range from 2 to 18 and the tamper evidence band has a second melt flow index that is less than the first melt flow index.

19. The closure of claim 18, wherein the thread pitch is in a range from 0.5 mm to 1.5 mm.

20. The closure of claim 18, wherein closure portion has a height in a range from 6 mm to 8 mm.

21. The closure of claim 18, further comprising a multiplicity of thin connections attaching the tamper evidence band to the closure portion, wherein the thin connections configured to break apart when the force applied to the closure portion is above a first predetermined threshold, wherein the threshold is a second predetermined threshold that is greater than the first predetermined threshold.

22. A closure for sealing contents within an interior of a container, the closure comprising:
- a closure portion defining a closure top wall and a closure side wall extending from the closure top wall, the closure portion configured to be removed from a finish portion of the container by rotatably disengaging from threads of the finish portion;
- a tamper evidence band configured to remain engaged with the finish portion when the closure portion is removed from the finish portion; and
- an anchor extending from the closure portion to the tamper evidence band, the anchor configured to keep the closure portion attached to the tamper evidence band when a force applied to the closure portion is below a predetermined threshold,
- wherein the closure portion has a first melt flow index and the tamper evidence band has a second melt flow index that is less than the first melt flow index.

23. The closure of claim 22, wherein the closure portion has a first melt flow index in a range from 2 to 18.

* * * * *